(12) United States Patent
Kawano

(10) Patent No.: US 12,037,692 B2
(45) Date of Patent: Jul. 16, 2024

(54) WATER ELECTROLYSIS SYSTEM AND METHOD OF OPERATING WATER ELECTROLYSIS SYSTEM

(71) Applicant: HONDA MOTOR CO., LTD., Tokyo (JP)

(72) Inventor: Takumi Kawano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/111,647

(22) Filed: Feb. 20, 2023

(65) Prior Publication Data

US 2023/0279558 A1 Sep. 7, 2023

(30) Foreign Application Priority Data

Mar. 3, 2022 (JP) .................. 2022-032328

(51) Int. Cl.
*C25B 1/04* (2021.01)
*C25B 9/19* (2021.01)
*C25B 13/00* (2006.01)
*C25B 15/02* (2021.01)
*C25B 15/08* (2006.01)
*H01M 8/0656* (2016.01)

(52) U.S. Cl.
CPC .................. *C25B 1/04* (2013.01); *C25B 9/19* (2021.01); *C25B 13/00* (2013.01); *C25B 15/02* (2013.01); *C25B 15/083* (2021.01); *H01M 8/0656* (2013.01)

(58) Field of Classification Search
CPC .................................................. B01D 53/326
See application file for complete search history.

(56) References Cited

U.S. PATENT DOCUMENTS

| 5,690,797 | A | 11/1997 | Harada et al. |
| 10,648,089 | B2 * | 5/2020 | Preston ..................... C25B 1/04 |
| 2010/0206740 | A1 | 8/2010 | Takeuchi et al. |
| 2018/0202053 | A1 | 7/2018 | Harano et al. |
| 2021/0071310 | A1 * | 3/2021 | Oto ........................... C25B 9/19 |

FOREIGN PATENT DOCUMENTS

| JP | H08-193287 A | 7/1996 |
| JP | H09-139217 A | 5/1997 |
| JP | H11-047774 A | 2/1999 |
| JP | 2002-129372 A | 5/2002 |
| JP | 2003-342766 A | 12/2003 |
| JP | 2010-189728 A | 9/2010 |
| JP | 2011-256432 A | 12/2011 |
| JP | 2018-165386 A | 10/2018 |
| WO | 2017/056277 A1 | 4/2017 |

* cited by examiner

*Primary Examiner* — Brian W Cohen
(74) *Attorney, Agent, or Firm* — Carrler, Shende & Associates P.C.; Fulchand P. Shende; Joseph P. Carrier

(57) ABSTRACT

A water electrolysis system includes a control device. The control device outputs a first current command value, which is a constant current command value, to one from among a first power source device and a second power source device. The control device generates a second current command value, which is an undefined current command value, based on an amount of the hydrogen gas inside a gas-liquid separator, and outputs the second current command value to another one from among the first power source device and the second power source device.

7 Claims, 5 Drawing Sheets

WATER ELECTROLYSIS SYSTEM AND METHOD OF OPERATING WATER ELECTROLYSIS SYSTEM

CROSS-REFERENCE TO RELATED APPLICATIONS

This application is based upon and claims the benefit of priority from Japanese Patent Application No. 2022-032328 filed on Mar. 3, 2022, the contents of which are incorporated herein by reference.

BACKGROUND OF THE INVENTION

Field of the Invention

The present invention relates to a water electrolysis system and a method of operating a water electrolysis system.

Description of the Related Art

In general, hydrogen gas is used as a fuel gas in a fuel cell that is installed in a fuel cell vehicle or the like. Oxygen gas (an oxygen containing gas) is used as an oxidizing gas. The hydrogen gas can be produced, for example, by a water electrolysis system equipped with a water electrolysis stack. As disclosed, for example, in JP H09-139217 A, as the water electrolysis stack, a solid polymer type is known which is capable of being operated at a relatively high current density.

SUMMARY OF THE INVENTION

Incidentally, in addition to the water electrolysis stack, there are cases in which a gas-liquid separator and a hydrogen pressure boosting stack are provided in the water electrolysis system. The gas-liquid separator separates hydrogen gas obtained by carrying out electrolysis of the water by the water electrolysis stack, and surplus water (unreacted water) that has not been subjected to electrolysis. The hydrogen pressure boosting stack boosts the pressure of the hydrogen gas that was separated by the gas-liquid separator, and thereby generates a high pressure hydrogen gas.

In such a water electrolysis system, if an imbalance occurs between the amount of the hydrogen gas generated by the electrolysis of water by the water electrolysis stack, and the amount of the hydrogen gas that is used for boosting the pressure in the hydrogen pressure boosting stack, there is a tendency for the efficiency in producing the high pressure hydrogen gas to be reduced. Accordingly, there is a demand to correct the imbalance between the amount of the hydrogen gas generated by the electrolysis of water by the water electrolysis stack, and the amount of the hydrogen gas that is used for boosting the pressure in the hydrogen pressure boosting stack.

The present invention has the object of solving the aforementioned problem.

An aspect of the present invention is characterized by a water electrolysis system, comprising:
a water electrolysis stack including a membrane electrode assembly in which an ion exchange membrane is sandwiched between an anode and a cathode, and configured to carry out electrolysis of water;
a gas-liquid separator configured to separate hydrogen gas generated by electrolysis of the water by the water electrolysis stack, and the water; and
a hydrogen pressure boosting stack including a membrane electrode assembly in which a proton exchange membrane is sandwiched between an anode and a cathode, and configured to boost the pressure of the hydrogen gas that is separated by the gas-liquid separator;
the water electrolysis system further comprising:
a first power source device configured to adjust a voltage applied to the anode and the cathode of the water electrolysis stack, and to supply a current of a current command value between the anode and the cathode;
a second power source device configured to adjust a voltage applied to the anode and the cathode of the hydrogen pressure boosting stack, and to supply a current of the current command value between the anode and the cathode; and
a control device configured to control the first power source device and the second power source device;
wherein the control device comprises:
a first command generating unit configured to generate a first current command value, which is a constant current command value;
a second command generating unit configured to generate a second current command value, which is an undefined current command value, based on an amount of the hydrogen gas inside the gas-liquid separator; and
a command output unit configured to output the first current command value to one from among the first power source device and the second power source device, and to output the second current command value to another one from among the first power source device and the second power source device.

Further, another aspect of the present invention is characterized by a method of operating a water electrolysis system, wherein the water electrolysis system comprises:
a water electrolysis stack including a membrane electrode assembly in which an ion exchange membrane is sandwiched between an anode and a cathode, and configured to carry out electrolysis of water;
a gas-liquid separator configured to separate hydrogen gas generated by electrolysis of the water by the water electrolysis stack, and the water; and
a hydrogen pressure boosting stack including a membrane electrode assembly in which a proton exchange membrane is sandwiched between an anode and a cathode, and configured to boost the pressure of the hydrogen gas that is separated by the gas-liquid separator;
the method of operating the water electrolysis system comprising:
a first output step of generating a first current command value, which is a constant current command value, and outputting the first current command value to one from among the first power source device connected to the water electrolysis stack and the second power source device connected to the hydrogen pressure boosting stack; and
a second output step of generating a second current command value, which is an indefinite current command value, based on an amount of the hydrogen gas inside the gas-liquid separator, and outputting the second current command value to another one from among the first power source device and the second power source device.

According to the above-described aspects, one from among the amount of the hydrogen gas that is generated and the amount of the hydrogen gas that is used is constant, and the other one from among the amount of the hydrogen gas that is generated and the amount of the hydrogen gas that is used can be adjusted based on the amount of the hydrogen gas inside the gas-liquid separator. As a result, it is possible to suppress an imbalance from occurring between the amount of the hydrogen gas that is generated and the amount of the hydrogen gas that is used.

The above and other objects, features, and advantages of the present invention will become more apparent from the following description when taken in conjunction with the accompanying drawings, in which preferred embodiments of the present invention are shown by way of illustrative example.

DETAILED DESCRIPTION OF THE INVENTION

Figure 1:
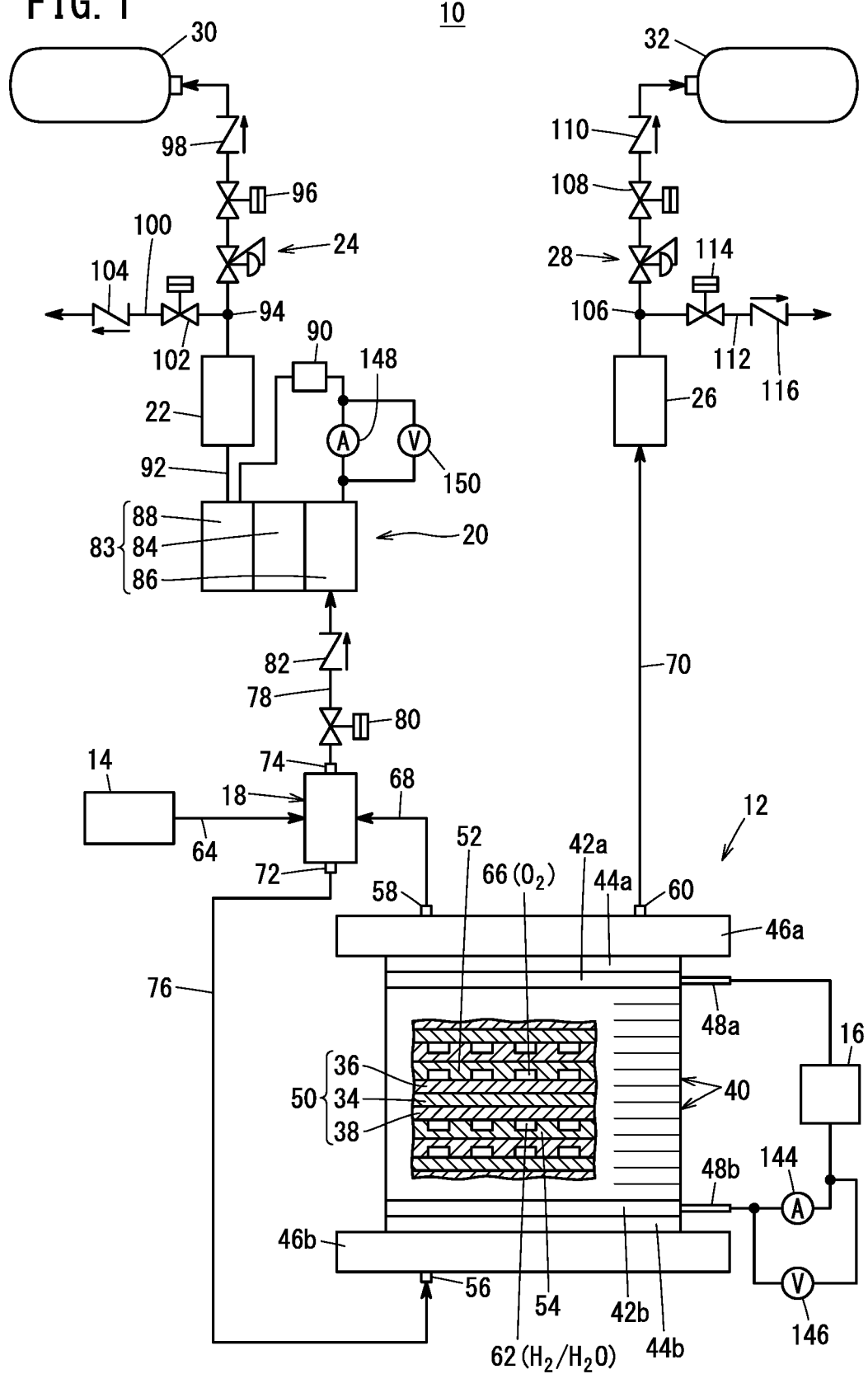
FIG. 1 is a schematic configuration explanatory diagram of the configuration of a water electrolysis system according to an embodiment.

As shown in FIG. 1, a water electrolysis system 10 according to the embodiment is primarily equipped with a water electrolysis stack 12, a water tank 14, a first power source device 16, a gas-liquid separator 18, a hydrogen pressure boosting stack 20, a hydrogen gas dehumidification unit 22, a hydrogen gas discharge regulating unit 24, an oxygen gas dehumidification unit 26, and an oxygen gas discharge regulating unit 28.

The water electrolysis system 10 is capable of producing hydrogen gas in a state of high pressure hydrogen gas in which the hydrogen gas has been compressed, for example, from 1 to 100 MPa. Further, the water electrolysis system 10 is capable of producing oxygen gas in a state of high pressure oxygen gas in which the oxygen gas has been compressed, for example, from 1 to 100 MPa. The high pressure hydrogen gas that is produced by the water electrolysis system 10 can be accommodated, for example, in a hydrogen gas tank 30. The hydrogen gas tank 30 is detachably installed in the water electrolysis system 10. The high pressure oxygen gas that is produced by the water electrolysis system 10 can be accommodated, for example, in an oxygen gas tank 32. The oxygen gas tank 32 is detachably installed in the water electrolysis system 10.

The water electrolysis stack 12 includes an ion exchange membrane 34, an anode 36, and a cathode 38. The ion exchange membrane 34 is sandwiched between the anode 36 and the cathode 38. The anode 36 and the cathode 38 are separated from each other via the ion exchange membrane 34. The water electrolysis stack 12 carries out electrolysis of water (water electrolysis), and thereby generates an oxygen gas at the anode 36. Further, the water electrolysis stack 12 carries out electrolysis of the water (water electrolysis), and thereby generates a hydrogen gas at the cathode 38. Stated otherwise, the water electrolysis stack 12 is a so-called solid polymer type of water electrolysis stack.

According to the present embodiment, the water electrolysis stack 12 is equipped with a cell unit in which a plurality of unit cells 40 are stacked. In the cell unit, a terminal plate 42a, an insulating plate 44a, and an end plate 46a are sequentially arranged in an outward direction at one end in the stacking direction of the unit cells 40. Further, in the cell unit, a terminal plate 42b, an insulating plate 44b, and an end plate 46b are sequentially arranged in an outward direction at the other end in the stacking direction of the unit cells 40.

The end plates 46a and 46b are fastened and retained in an integral manner. Terminal portions 48a and 48b are provided in an outwardly projecting manner on side portions of the terminal plates 42a and 42b. The first power source device 16 is electrically connected via wiring to the terminal portions 48a and 48b. The first power source device 16 is capable of applying a voltage to the anode 36 and the cathode 38 of the water electrolysis stack 12 via the terminal portions 48a and 48b. Further, the first power source device 16 is configured to be capable of changing the value of the voltage applied between the anode 36 and the cathode 38.

Each of the unit cells 40 comprises a membrane electrode assembly 50 (MEA), an anode side separator 52, and a cathode side separator 54. Each of the membrane electrode assembly 50, the anode side separator 52, and the cathode side separator 54 is disk-shaped, for example. The membrane electrode assembly 50 is sandwiched between the anode side separator 52 and the cathode side separator 54. The membrane electrode assembly 50 includes the ion exchange membrane 34, the anode 36, and the cathode 38. The anode 36 is disposed on one surface of the ion exchange membrane 34. The cathode 38 is disposed on another surface of the ion exchange membrane 34. In each of the unit cells 40, the anode 36 and the cathode 38 are sealed (isolated) from each other by the ion exchange membrane 34, and for example, by a non-illustrated sealing member.

According to the present embodiment, the ion exchange membrane 34 is an anion exchange membrane. Stated otherwise, the ion exchange membrane 34 possesses anion conductivity, being capable of selectively transferring anions (for example, hydroxide ions OH—). As an example of this type of ion exchange membrane 34, there may be cited a hydrocarbon-based solid polymer membrane (for example, polystyrene and modified products thereof) having an anion exchange group (for example, a quaternary ammonium group and a pyridinium group) therein.

The anode 36 includes an anode catalyst layer and an anode side current collector, although neither of these items are shown. The anode catalyst layer is formed on one surface of the ion exchange membrane 34. The anode side current collector is superimposed on the anode catalyst layer. The cathode 38 includes a cathode catalyst layer and a cathode side current collector, although neither of these items are shown. The cathode catalyst layer is formed on another surface of the ion exchange membrane 34. The cathode side current collector is superimposed on the cathode catalyst layer.

A water supply communication hole 56, a hydrogen discharge communication hole 58, and an oxygen discharge communication hole 60 are provided on an outer peripheral portion of each of the unit cells 40. The water supply communication holes 56 that are provided to the plurality of unit cells 40 communicate with each other in the stacking direction of the plurality of unit cells 40. The hydrogen discharge communication holes 58 that are provided to the plurality of unit cells 40 communicate with each other in the stacking direction of the plurality of unit cells 40. The oxygen discharge communication holes 60 that are provided to the plurality of unit cells 40 communicate with each other in the stacking direction of the plurality of unit cells 40. The water supply communication holes 56 and the hydrogen discharge communication holes 58 communicate with a first cell flow path 62. For example, at least either a plurality of flow path grooves or a plurality of embossments are formed on the surface of the cathode side separator 54 facing toward the membrane electrode assembly 50 (the cathode side current collector). The first cell flow path 62 is constituted, for example, by at least either the aforementioned plurality of flow path grooves or the plurality of embossments on the cathode side separator 54.

Water is supplied via a circulation flow path 76 from the gas-liquid separator 18 to the water supply communication hole 56. By the water that was supplied to the water supply communication hole 56 flowing into the first cell flow path 62, the water is supplied to the cathode 38 of each of the unit cells 40. Stated otherwise, in the water electrolysis stack 12 according to the present embodiment, the water is supplied to the cathode 38 of each of the unit cells 40. When the water is subjected to electrolysis with the voltage applied by the first power source device 16, hydrogen gas is generated at the cathode 38 of each of the unit cells 40. Further, oxygen gas is generated at the anode 36 of each of the unit cells 40.

The hydrogen gas generated at the cathode 38 is discharged to the hydrogen discharge communication hole 58 via the first cell flow path 62. In this manner, the hydrogen gas which is discharged to the hydrogen discharge communication hole 58 contains surplus water (unreacted water) that has not been subjected to water electrolysis in the water electrolysis stack 12. In other words, the discharged fluid that is discharged into the hydrogen discharge communication hole 58 contains hydrogen gas, unreacted water in a liquid state (liquid water), and unreacted water in a gaseous state (water vapor).

The oxygen discharge communication hole 60 communicates with a second cell flow path 66. For example, at least either a plurality of flow path grooves or a plurality of embossments are formed on the surface of the anode side separator 52 facing toward the membrane electrode assembly 50 (the anode side current collector). The second cell flow path 66 is constituted, for example, by at least either the aforementioned plurality of flow path grooves or the plurality of embossments on the anode side separator 52. The oxygen gas, which is generated by water electrolysis at the anode 36, is discharged to the oxygen discharge communication hole 60 via the second cell flow path 66.

In the water electrolysis stack 12, as noted previously, the circulation flow path 76 communicates with the water supply communication hole 56. A cathode discharge flow path 68 communicates with the hydrogen discharge communication hole 58. An anode discharge flow path 70 communicates with the oxygen discharge communication hole 60.

The gas-liquid separator 18 is disposed on the cathode discharge flow path 68. The water tank 14 is connected to the gas-liquid separator 18 via a water supply flow path 64. The discharged fluid flows into the gas-liquid separator 18 via the hydrogen discharge communication hole 58 and the cathode discharge flow path 68. The gas-liquid separator 18 separates the discharged fluid into gas components (hydrogen gas and water vapor) and liquid components (liquid water). The gas-liquid separator 18 includes a liquid discharge port 72 through which the liquid water is discharged, and a gas discharge port 74 through which hydrogen gas that contains water vapor is discharged. The gas-liquid separator 18 discharges from the gas discharge port 74 the gas components that was separated from the discharged fluid. The gas-liquid separator 18 discharges from the liquid discharge port 72 the liquid component (liquid water) that was separated from the discharged fluid. In the case that the water was supplied from the water tank 14 via the water supply flow path 64, the gas-liquid separator 18 discharges such water from the liquid discharge port 72. The water that was discharged from the liquid discharge port 72 is delivered via the circulation flow path 76 to the water supply communication hole 56.

The gas discharge port 74 of the gas-liquid separator 18 communicates with a first hydrogen gas flow path 78. The first hydrogen gas flow path 78 guides the hydrogen gas that contains the water vapor discharged from the gas discharge port 74 to the hydrogen pressure boosting stack 20. The first hydrogen gas flow path 78 includes an upstream location where the gas discharge port 74 is provided, and a downstream location where the hydrogen pressure boosting stack 20 is provided. A first hydrogen ON/OFF valve 80 and a first hydrogen check valve 82 are provided sequentially in this order from an upstream location toward a downstream location in the first hydrogen gas flow path 78. The first hydrogen ON/OFF valve 80, for example, is made up from an electromagnetic valve or an electric valve. The first hydrogen ON/OFF valve 80 serves to open and close the first hydrogen gas flow path 78 under the control of a control unit. The first hydrogen check valve 82 prevents the gas in the first hydrogen gas flow path 78 from flowing backward in a direction from the hydrogen pressure boosting stack 20 toward the gas discharge port 74.

The hydrogen pressure boosting stack 20 boosts the pressure of the water vapor containing hydrogen gas that was discharged from the gas discharge port 74. More specifically, the hydrogen pressure boosting stack 20 boosts the pressure of the hydrogen gas that was separated by the gas-liquid separator 18. The hydrogen pressure boosting stack 20 includes a membrane electrode assembly (MEA) 83 and a second power source device 90. The membrane electrode assembly 83 includes a proton exchange membrane 84, an anode 86, and a cathode 88. The proton exchange membrane 84 is sandwiched between the anode 86 and the cathode 88. The anode 86 and the cathode 88 are separated from each other via the proton exchange membrane 84. The second power source device 90 is capable of applying a voltage to the anode 86 and the cathode 88 of the hydrogen pressure boosting stack 20. Further, the second power source device 90 is configured to be capable of changing the value of the voltage applied between the anode 86 and the cathode 88.

The proton exchange membrane 84 possesses proton conductivity, being capable of selectively transferring protons. The material of the proton exchange membrane 84 is not particularly limited, but as one example thereof, there may be cited a fluorine-based polymer membrane having a sulfonic acid group such as a perfluorosulfonic acid-based polymer. This type of proton exchange membrane 84, by being maintained in a humidified state, is capable of exhibiting satisfactory proton conductivity.

The anode 86 includes an anode catalyst layer and an anode gas diffusion layer, although neither of these items are shown. The anode catalyst layer is formed on one surface of the proton exchange membrane 84. The anode gas diffusion layer is superimposed on the anode catalyst layer. The cathode 88 includes a cathode catalyst layer and a cathode gas diffusion layer, although neither of these items are shown. The cathode catalyst layer is formed on another surface of the proton exchange membrane 84. The cathode gas diffusion layer is superimposed on the cathode catalyst layer.

Hydrogen gas containing water vapor, which was discharged from the gas discharge port 74, is supplied to the anode 86 via the first hydrogen gas flow path 78. Using the water vapor, the proton exchange membrane 84 can be maintained in a humidified state. At the anode 86, the hydrogen gas is ionized into protons under the application of a voltage by the second power source device 90. The protons are returned to the hydrogen gas by moving through the proton exchange membrane 84 and arriving at the cathode 88. In this manner, the protons are transferred from the anode 86 toward the cathode 88, and thereby enable a compressed hydrogen gas to be generated at the cathode 88.

Therefore, in accordance with the hydrogen pressure boosting stack 20, hydrogen gas, which is higher in pressure than the hydrogen gas that was supplied to the anode 86, is capable of being discharged from the cathode 88. Stated otherwise, the hydrogen pressure boosting stack 20 serves as an electrochemical hydrogen compressor (EHC) that is capable of electrochemically compressing the hydrogen gas.

The cathode 88 communicates with one end of a second hydrogen gas flow path 92. Owing to this feature, the hydrogen gas at the cathode 88 becomes capable of flowing into the second hydrogen gas flow path 92. A non-illustrated tank attachment mechanism or the like is provided on another end of the second hydrogen gas flow path 92. Via such a tank attachment mechanism, the hydrogen gas tank 30 is attached in a detachable manner to the second hydrogen gas flow path 92. More specifically, the second hydrogen gas flow path 92 guides the hydrogen gas from an upstream location where the cathode 88 is provided to a downstream location where the hydrogen gas tank 30 is provided.

In the second hydrogen gas flow path 92, from the upstream location to the downstream location thereof, there are provided sequentially in this order the hydrogen gas dehumidification unit 22, a hydrogen purging flow path branching section 94, the hydrogen gas discharge regulating unit 24, a second hydrogen ON/OFF valve 96, and a second hydrogen check valve 98.

The hydrogen gas dehumidification unit 22 dehumidifies the hydrogen gas that was discharged from the cathode 88. Stated otherwise, the hydrogen gas dehumidification unit 22 separates the water vapor from the hydrogen gas. As one example of the hydrogen gas dehumidification unit 22, there may be cited a cooling mechanism (not shown) such as a Peltier cooler or the like. In this case, due to being cooled by the cooling mechanism and reducing the saturated water vapor content therein, the moisture (water vapor) contained within the hydrogen gas is separated, and the hydrogen gas can achieve a desired dry state. In this case, the cooling mechanism may control the cooling temperature, for example, in accordance with at least one of the ambient temperature of the water electrolysis system 10 and the pressure of the hydrogen gas.

Further, as another example of the hydrogen gas dehumidification unit 22, instead of the aforementioned cooling mechanism, or together with the aforementioned cooling mechanism, there may be used a zeolite-based, an activated carbon-based, or a silica gel-based moisture adsorbent or the like. Moreover, the aforementioned moisture adsorbent may be a paste-like moisture getter agent or the like with which a target location can be coated. In this case, the hydrogen gas dehumidification unit 22 may be equipped with a configuration that enables the moisture adsorbent to be regenerated, by at least one of a temperature swing adsorption method (TSA) and a pressure swing adsorption method (PSA). Further, the hydrogen gas dehumidification unit 22, for example, may be equipped solely with a configuration that enables the moisture adsorbent to be replaced. Moreover, as long as the hydrogen gas dehumidification unit 22 is capable of dehumidifying the hydrogen gas, the specific structure thereof is not limited to the configurations described above.

The hydrogen gas discharge regulating unit 24 regulates the passage of the hydrogen gas through the hydrogen gas discharge regulating unit 24. Consequently, the hydrogen gas discharge regulating unit 24 adjusts the pressure of the hydrogen gas in the second hydrogen gas flow path 92. More specifically, the hydrogen gas discharge regulating unit 24 makes the amount of the hydrogen gas that passes through the hydrogen gas discharge regulating unit 24 smaller (including a passage amount of zero), for example, than the amount of the hydrogen gas generated at the cathode 88. Consequently, the pressure of the hydrogen gas in the second hydrogen gas flow path 92 can be increased, and thereby enable the high pressure hydrogen gas to be produced.

According to the present embodiment, the hydrogen gas discharge regulating unit 24 is a back pressure valve that is opened while maintaining the pressure on the primary side thereof (more upstream than the hydrogen gas discharge regulating unit 24 in the second hydrogen gas flow path 92) at a set pressure. However, the present invention is not particularly limited to this feature. For example, the hydrogen gas discharge regulating unit 24 may be an ON/OFF valve or the like which, by being controlled to open and close by the control unit, maintains the pressure in the second hydrogen gas flow path 92 at the set pressure.

The hydrogen gas discharge regulating unit 24 adjusts the pressure of the hydrogen gas in the second hydrogen gas flow path 92 from 1 to 100 MPa, and thereby generates the high pressure hydrogen gas. Moreover, for example, from the standpoint of facilitating the supply of the hydrogen gas to the hydrogen gas tank 30, the hydrogen gas discharge regulating unit 24 preferably sets the pressure of the high pressure hydrogen gas to be from at least 8 MPa to greater than or equal to 20 MPa. Further, for example, in the case that the hydrogen gas is supplied to the hydrogen gas tank 30 or the like for use in a fuel cell vehicle, the hydrogen gas discharge regulating unit 24 preferably sets the pressure of the high pressure hydrogen gas to be from 70 MPa to greater than or equal to 85 MPa.

The hydrogen purging flow path branching section 94 is arranged between the hydrogen gas discharge regulating unit 24 and the hydrogen pressure boosting stack 20. A hydrogen purging flow path 100 makes it possible to perform a degassing (pressure reducing) operation inside the water electrolysis system 10, for example, at a time when the water electrolysis system 10 is stopped. The hydrogen purging flow path 100 guides the hydrogen gas that has flowed therein from the hydrogen purging flow path branching section 94 to the exterior of the water electrolysis system 10. A hydrogen purging ON/OFF valve 102 and a hydrogen purging check valve 104 are provided sequentially in this order from an upstream location toward a downstream location in the hydrogen purging flow path 100.

The hydrogen purging ON/OFF valve 102, for example, is made up from an electromagnetic valve or an electric valve. The hydrogen purging ON/OFF valve 102 opens and closes the hydrogen purging flow path 100 under the control of the control unit. At a time when the hydrogen purging ON/OFF valve 102 is in a closed state, the hydrogen gas is prevented from flowing from the second hydrogen gas flow path 92 into the hydrogen purging flow path 100. At a time when the hydrogen purging ON/OFF valve 102 is in an open state, the hydrogen gas flows from the second hydrogen gas flow path 92 into the hydrogen purging flow path 100. The hydrogen gas that has flowed into the hydrogen purging flow path 100 is discharged to the exterior of the water electrolysis system 10. The hydrogen purging check valve 104 prevents gas from flowing from the exterior of the water electrolysis system 10 into the hydrogen purging flow path 100.

The second hydrogen ON/OFF valve 96, for example, is made up from an electromagnetic valve or an electric valve. The second hydrogen ON/OFF valve 96 serves to open and close the second hydrogen gas flow path 92 under the control of the control unit. By the second hydrogen ON/OFF valve 96 being placed in an open state, the hydrogen gas becomes capable of being supplied from the second hydrogen gas flow path 92 to the hydrogen gas tank 30. The second hydrogen check valve 98 prevents the hydrogen gas from flowing backward in a direction from the hydrogen gas tank 30 toward the upstream location (the second hydrogen ON/OFF valve 96) of the second hydrogen gas flow path 92.

As noted previously, one end of the anode discharge flow path 70 is in communication with the oxygen discharge communication hole 60 of the water electrolysis stack 12. Therefore, the oxygen gas generated at the anode 36 of the water electrolysis stack 12 is capable of flowing into the anode discharge flow path 70. A non-illustrated tank attachment mechanism or the like is provided at another end of the anode discharge flow path 70, and the oxygen gas tank 32 is attached in a detachable manner via the tank attachment mechanism. More specifically, the anode discharge flow path 70 guides the oxygen gas in a direction from the oxygen discharge communication hole 60 (an upstream location) toward the oxygen gas tank 32 (a downstream location).

In the anode discharge flow path 70, from the upstream location to the downstream location thereof, there are provided sequentially in this order the oxygen gas dehumidification unit 26, an oxygen purging flow path branching section 106, the oxygen gas discharge regulating unit 28, an oxygen ON/OFF valve 108, and an oxygen check valve 110.

The oxygen gas dehumidification unit 26 serves to dehumidify the oxygen gas that was discharged from the anode 36 (the oxygen discharge communication hole 60) of the water electrolysis stack 12. The oxygen gas dehumidification unit 26 can be configured, for example, in the same manner as the above-described hydrogen gas dehumidification unit 22. However, as long as the oxygen gas dehumidification unit 26 is capable of dehumidifying the oxygen gas, the specific structure thereof is not particularly limited.

The oxygen gas discharge regulating unit 28 regulates the passage of the oxygen gas through the oxygen gas discharge regulating unit 28. Consequently, the oxygen gas discharge regulating unit 28 regulates the discharging of the oxygen gas from the anode 36. Specifically, the oxygen gas discharge regulating unit 28 makes the amount of the oxygen gas that passes through the oxygen gas discharge regulating unit 28 smaller (including a passage amount of zero), for example, than the amount of the oxygen gas generated at the anode 36. Owing to this feature, the pressure of the oxygen gas at the anode 36 is increased, and becomes higher in pressure than the pressure of the hydrogen gas at the cathode 38. More specifically, a differential pressure is provided between the anode 36 and the cathode 38 of the water electrolysis stack 12. Further, the pressure of the oxygen gas in the anode discharge flow path 70 is increased, and thereby a high pressure oxygen gas is generated.

According to the present embodiment, the oxygen gas discharge regulating unit 28 is a back pressure valve that is opened while maintaining the pressure of the oxygen gas on the primary side thereof (at the anode 36, and the anode discharge flow path 70) at a set pressure. However, the present invention is not particularly limited to this feature. For example, the oxygen gas discharge regulating unit 28 may be an ON/OFF valve or the like which, by being controlled to open and close by the control unit, maintains the pressure at the anode 36 and the pressure of the high pressure oxygen gas at the set pressure.

The oxygen gas discharge regulating unit 28 adjusts the pressure of the oxygen gas at the anode 36 from 1 to 100 MPa. Consequently, the oxygen gas discharge regulating unit 28 makes the pressure of the oxygen gas at the anode 36 higher in pressure than the pressure of the hydrogen gas at the cathode 38. Stated otherwise, at the time that the water electrolysis system 10 is operated, the pressure of the hydrogen gas at the cathode 38 (in the cathode discharge flow path 68 and the first hydrogen gas flow path 78) is maintained to be less than 1 MPa (for example, from 0.01 to 0.9 MPa).

As one example of a method of maintaining the pressure of the hydrogen gas at the cathode 38, there may be cited a method of setting the flow rate of the hydrogen gas that passes through the cathode discharge flow path 68, the gas-liquid separator 18, and the first hydrogen gas flow path 78 so as to be sufficiently large in relation to the amount of the hydrogen gas that is generated at the cathode 38. Further, there may be cited a method of setting the amount of the hydrogen gas that is generated at the cathode 88 to be sufficiently large in relation to the amount of the hydrogen gas that is generated at the cathode 38.

Moreover, as noted previously, in the case that the water is supplied to the cathode 38 with a hydrogen gas pressure of 0.01 to 0.9 MPa, the pressure of the water in the water supply flow path 64 and the circulation flow path 76 is set, for example, from 0.01 to 0.6 MPa.

For example, from the standpoint of facilitating the supply of the oxygen gas to the oxygen gas tank 32, the oxygen gas discharge regulating unit 28 preferably sets the pressure of the high pressure oxygen gas to be from at least 8 MPa to greater than or equal to 20 MPa. Further, for example, from the standpoint of increasing the amount of the oxygen gas accommodated in the oxygen gas tank 32 insofar as possible to the extent that handling of the oxygen gas does not become difficult, the oxygen gas discharge regulating unit 28 preferably sets the pressure of the high pressure oxygen gas to be from 30 MPa to 40 MPa.

The oxygen purging flow path branching section 106 is arranged between the oxygen gas discharge regulating unit 28 and the oxygen gas dehumidification unit 26. An oxygen purging flow path 112 makes it possible to perform a degassing (pressure reducing) operation inside the water electrolysis system 10, for example, at a time when the water electrolysis system 10 is stopped. The oxygen purging flow path 112 guides the oxygen gas that has flowed therein from the oxygen purging flow path branching section 106, to the exterior of the water electrolysis system 10. An oxygen purging ON/OFF valve 114 and an oxygen purging check valve 116 are provided sequentially in this order from an upstream location toward a downstream location in the oxygen purging flow path 112.

The oxygen purging ON/OFF valve 114, for example, is made up from an electromagnetic valve or an electric valve. The oxygen purging ON/OFF valve 114 opens and closes the oxygen purging flow path 112 under the control of the control unit. At a time when the oxygen purging ON/OFF valve 114 is in a closed state, the oxygen gas is prevented from flowing from the anode discharge flow path 70 into the oxygen purging flow path 112. At a time when the oxygen purging ON/OFF valve 114 is in an open state, the oxygen gas flows into the oxygen purging flow path 112 from the anode discharge flow path 70. The oxygen gas that has flowed into the oxygen purging flow path 112 is discharged to the exterior of the water electrolysis system 10. The oxygen purging check valve 116 prevents gas from flowing from the exterior of the water electrolysis system 10 into the oxygen purging flow path 112.

The oxygen ON/OFF valve 108, for example, is made up from an electromagnetic valve or an electric valve. The oxygen ON/OFF valve 108 opens and closes the anode discharge flow path 70 under the control of the control unit. By the oxygen ON/OFF valve 108 being placed in an open state, the oxygen gas becomes capable of being supplied from the anode discharge flow path 70 to the oxygen gas tank 32. The oxygen check valve 110 prevents the oxygen gas from flowing backward in a direction from the oxygen gas tank 32 toward the upstream location (the oxygen ON/OFF valve 108) of the anode discharge flow path 70.

The water electrolysis system 10 according to the present embodiment is basically configured in the manner described above. A description will now be given concerning an example of a control method when the water electrolysis system 10 is initiated and thereby produces the hydrogen gas and the oxygen gas.

According to the control method, after the water electrolysis system 10 is initiated and the various statuses thereof are confirmed, a water supplying step is carried out. In the water supplying step, water is supplied via the water supply flow path 64 and the gas-liquid separator 18 from the water tank 14 to the water supply communication hole 56 of the water electrolysis stack 12. Consequently, the water is supplied to the cathode 38 of the water electrolysis stack 12.

Next, a voltage application step of applying a voltage to the water electrolysis stack 12 by the first power source device 16 is carried out. In the voltage application step, the voltage between the anode 36 and the cathode 38 is maintained as a standby voltage in close proximity to the electrolysis voltage, until the water electrolysis stack 12 becomes placed in a state of being capable of generating the hydrogen gas and the oxygen gas. In addition, after the water electrolysis stack 12 has become capable of generating the hydrogen gas and the oxygen gas, by the voltage between the anode 36 and the cathode 38 being increased to the electrolysis voltage, water electrolysis is initiated. Thereafter, the voltage value (the electrolysis voltage value) is changed as necessary, and the amount of the hydrogen gas generated in the water electrolysis stack 12 is adjusted.

Hereinafter, a description will be given concerning the steps up until the hydrogen gas tank 30 is filled with the hydrogen gas that is generated at the cathode 38.

The hydrogen gas that was generated at the cathode 38 by the water electrolysis step is discharged, in the form of a discharged fluid containing unreacted water (liquid water and water vapor), from the hydrogen discharge communication hole 58 of the water electrolysis stack 12 to the cathode discharge flow path 68. The discharged fluid that was discharged to the cathode discharge flow path 68 is delivered to the gas-liquid separator 18. The gas-liquid separator 18 carries out a water separation step of separating the discharged fluid into liquid water, which is a liquid component, and hydrogen gas and water vapor, which are gas components.

The liquid water that was separated in the water separation step is discharged from the liquid discharge port 72 of the gas-liquid separator 18 into the circulation flow path 76. The liquid water that was discharged into the circulation flow path 76 is supplied to the cathode 38 via the water supply communication hole 56.

On the other hand, the hydrogen gas and the water vapor that were separated in the water separation step are discharged from the gas discharge port 74 of the gas-liquid separator 18 into the first hydrogen gas flow path 78. At the time when the water electrolysis system 10 is initiated, the first hydrogen ON/OFF valve 80 is placed in an open state. Therefore, the hydrogen gas and the water vapor that were discharged into the first hydrogen gas flow path 78 are passed through the first hydrogen ON/OFF valve 80, and thereafter pass through the first hydrogen check valve 82. The hydrogen gas and the water vapor that have passed through the first hydrogen check valve 82 are supplied to the anode 86 of the hydrogen pressure boosting stack 20. At this time, by the first hydrogen check valve 82, the hydrogen gas is prevented from flowing backward from the hydrogen pressure boosting stack 20 toward the first hydrogen ON/OFF valve 80.

In the case that the supply of the hydrogen gas to the anode 86 has been confirmed, then in the hydrogen pressure boosting stack 20, application of an operating voltage by the second power source device 90 is initiated. The operating voltage is a voltage of a size which, by the operating voltage being applied between the anode 86 and the cathode 88, is capable of generating the compressed hydrogen gas at the cathode 88. Stated otherwise, by the operating voltage being applied from the second power source device 90, the hydrogen pressure boosting stack 20 carries out a hydrogen gas pressure boosting step of boosting the pressure of the hydrogen gas. In the hydrogen gas pressure boosting step, the voltage value (the value of the operating voltage) is changed as necessary, whereby an adjustment in the amount of the hydrogen gas used for boosting the pressure of the hydrogen gas is carried out.

Moreover, as one example of a method for confirming that the hydrogen gas has been supplied to the anode 86, there may be cited a pressure sensor (not shown) that is provided at the anode 86. In this case, the second power source device 90 compares the measurement value of the pressure sensor with a predetermined threshold value. In the case that the measured value of the pressure sensor has exceeded the predetermined threshold value, the second power source device 90 determines that the hydrogen gas has been supplied to the anode 86.

In accordance with the hydrogen gas pressure boosting step, by the hydrogen gas that was generated at the cathode 88 being discharged into the second hydrogen gas flow path 92, the hydrogen gas is dehumidified by the hydrogen gas dehumidification unit 22 that is provided in the second hydrogen gas flow path 92. Stated otherwise, the hydrogen gas dehumidification unit 22 carries out a hydrogen gas dehumidifying step of removing the water vapor contained in the hydrogen gas that was discharged from the cathode 88.

The hydrogen gas discharge regulating unit 24, which is provided at a rear stage of the hydrogen gas dehumidification unit 22 in the second hydrogen gas flow path 92, carries out a hydrogen gas pressure adjusting step of adjusting the pressure of the hydrogen gas in the second hydrogen gas flow path 92. In the hydrogen gas pressure adjusting step, for example, by adjusting the amount of the hydrogen gas that passes through the hydrogen gas discharge regulating unit 24 with respect to the amount of the hydrogen gas generated in the cathode 88, the pressure of the hydrogen gas in the second hydrogen gas flow path 92 is adjusted.

According to the present embodiment, the hydrogen gas discharge regulating unit 24 is a back pressure valve. Therefore, in the case that the pressure of the hydrogen gas on a primary (upstream) side thereof rises and reaches the set pressure that has been set, for example, within a range of from 1 to 100 MPa, the hydrogen gas discharge regulating unit 24 opens the valve while maintaining the pressure of the hydrogen gas on the primary side. Consequently, it becomes possible to supply the high pressure hydrogen gas the pressure of which has been raised to the set pressure to the secondary (downstream) side of the hydrogen gas discharge regulating unit 24.

At the time when the water electrolysis system 10 is initiated, the hydrogen purging ON/OFF valve 102 is placed in a closed state. Further, at the time when the water electrolysis system 10 is initiated, the second hydrogen ON/OFF valve 96 is placed in an open state. Therefore, the high pressure hydrogen gas that has reached the set pressure in the hydrogen gas pressure adjusting step does not flow into the hydrogen purging flow path 100, but instead passes through the second hydrogen ON/OFF valve 96 and the second hydrogen check valve 98, and is filled in the hydrogen gas tank 30. At this time, by the second hydrogen check valve 98, the hydrogen gas is prevented from flowing backward in a direction from the hydrogen gas tank 30 toward the second hydrogen ON/OFF valve 96.

As noted previously, the water electrolysis system 10 is capable of producing the high pressure hydrogen gas by boosting, with the hydrogen pressure boosting stack 20, the pressure of the hydrogen gas that is generated at the cathode 38 of the water electrolysis stack 12, and is capable of filling the high pressure hydrogen gas in the hydrogen gas tank 30.

Hereinafter, a description will be given concerning the steps up until the oxygen gas tank 32 is filled with the oxygen gas that is generated at the anode 36.

The oxygen gas that was generated at the anode 36 by the water electrolysis step is discharged from the oxygen discharge communication hole 60 into the anode discharge flow path 70. The oxygen gas that was discharged into the anode discharge flow path 70 is dehumidified by the oxygen gas dehumidification unit 26 provided on the anode discharge flow path 70. Stated otherwise, the oxygen gas dehumidification unit 26 carries out an oxygen gas dehumidifying step of removing the water vapor contained in the oxygen gas that was discharged from the anode 36.

The oxygen gas discharge regulating unit 28, which is provided at a rear stage of the oxygen gas dehumidification unit 26 of the anode discharge flow path 70, regulates the passage of the oxygen gas through the oxygen gas discharge regulating unit 28. Consequently, the oxygen gas discharge regulating unit 28 regulates the discharging of the oxygen gas from the anode 36. In this manner, due to the oxygen gas discharge regulating unit 28, for example, by the amount of the oxygen gas passing therethrough being adjusted in the oxygen gas discharge regulating unit 28 with respect to the amount of the oxygen gas generated at the anode 36, the pressure of the oxygen gas at the anode 36 is capable of being adjusted.

Specifically, the oxygen gas discharge regulating unit 28 raises the pressure of the oxygen gas at the anode 36 to be greater than or equal to 1 MPa. As noted previously, at a time when the water electrolysis system 10 is operated, the pressure of the hydrogen gas at the cathode 38 is maintained to be less than 1 MPa. Therefore, in the water electrolysis stack 12, the pressure of the oxygen gas at the anode 36 is maintained to be higher in pressure than the pressure of the hydrogen gas at the cathode 38.

According to the present embodiment, the oxygen gas discharge regulating unit 28 is a back pressure valve. Therefore, in the case that the pressuring of the oxygen gas on a primary (upstream) side thereof rises and reaches the set pressure that is set, for example, within a range of from 1 to 100 MPa, the oxygen gas discharge regulating unit 28 opens the valve while maintaining the pressure of the oxygen gas on the primary (upstream) side. Consequently, it becomes possible to maintain the anode 36 at a set pressure that is higher than the pressure at the cathode 38, together with supplying the high pressure oxygen gas, which has been boosted in pressure to the set pressure, to the secondary (downstream) side of the oxygen gas discharge regulating unit 28.

At the time when the water electrolysis system 10 is initiated, the oxygen purging ON/OFF valve 114 is placed in a closed state, and the oxygen ON/OFF valve 108 is placed in an open state under the control of the control unit. Therefore, the high pressure oxygen gas, which is adjusted to the set pressure in the manner described above, does not flow into the oxygen purging flow path 112, but instead passes through the oxygen ON/OFF valve 108 and the oxygen check valve 110, and is filled in the oxygen gas tank 32. At this time, by the oxygen check valve 110, the oxygen gas is prevented from flowing backward in a direction from the oxygen gas tank 32 toward the oxygen ON/OFF valve 108.

As noted previously, the water electrolysis system 10 produces an oxygen gas at the anode 36 of the water electrolysis stack 12. Further, by the oxygen gas discharge regulating unit 28, the water electrolysis system 10 regulates the discharging of the oxygen gas from the anode 36. Consequently, the water electrolysis system 10 is capable of boosting the pressure of the oxygen gas at the anode 36, and thereby forms a differential pressure in the water electrolysis system 10, together with producing the high pressure oxygen gas. Further, the water electrolysis system 10 is capable of filling the oxygen gas tank 32 with the produced high pressure oxygen gas.

Hereinafter, a description will be given concerning an example of a control method when the water electrolysis system 10 is stopped. According to the present control method, a depressurizing step is carried out. In the depressurizing step, the voltage applied to the water electrolysis stack 12 is gradually lowered by the first power source device 16. Further, in the depressurizing step, the hydrogen purging ON/OFF valve 102 and the oxygen purging ON/OFF valve 114 are placed in an open state. Consequently, the hydrogen gas and the oxygen gas in the water electrolysis system 10 are gradually lowered in pressure via the hydrogen purging flow path 100 and the oxygen purging flow path 112. At this time, on the first hydrogen gas flow path 78, the first hydrogen ON/OFF valve 80 is placed in an open state. However, by the first hydrogen check valve 82, the hydrogen gas is prevented from flowing backward from the hydrogen pressure boosting stack 20 toward the first hydrogen ON/OFF valve 80.

By carrying out the depressurizing step in the manner described above, it is possible to avoid a sudden reaction change from occurring in the water electrolysis stack 12. Owing to this feature, it is possible to suppress the occurrence of a potential difference in the same reaction surface of each of the unit cells 40. As a result, it becomes possible to effectively prevent a deterioration from occurring in the anode catalyst layer, the cathode catalyst layer, and the ion exchange membrane 34. Moreover, it should be noted that, for example, in the case that the period during which the water electrolysis system 10 is stopped is short, the depressurizing step may be omitted.

Before or after the depressurizing step, a shutoff step of placing each of the second hydrogen ON/OFF valve 96 and the oxygen ON/OFF valve 108 in a closed state is performed. Consequently, communication between a more upstream location (the water electrolysis stack 12) than the second hydrogen ON/OFF valve 96 in the second hydrogen gas flow path 92 and the hydrogen gas tank 30 is interrupted. Further, communication between a more upstream location (the water electrolysis stack 12) than the oxygen ON/OFF valve 108 in the anode discharge flow path 70 and the oxygen gas tank 32 is interrupted.

Moreover, in the depressurizing step, if a depressurizing speed is maintained at a predetermined speed that enables the pressure to be lowered relatively slowly, there may be cases in which it becomes easy for crossover to occur in the ion exchange membrane 34. In this case, in order to avoid crossover of the ion exchange membrane 34, each of the hydrogen purging ON/OFF valve 102 and the oxygen purging ON/OFF valve 114 is placed in an open state, while the application of voltage by the first power source device 16 is maintained. Further, the depressurizing speed is maintained at the predetermined speed, by adjusting the degree of opening of the hydrogen purging ON/OFF valve 102 and the oxygen purging ON/OFF valve 114, and by adjusting the pressure by each of the hydrogen gas discharge regulating unit 24 and the oxygen gas discharge regulating unit 28. Moreover, it should be noted that the predetermined speed in this case is a depressurizing speed that makes it possible to avoid a sudden reaction change from occurring in the water electrolysis stack 12.

In the case there is no concern that crossover will occur in the ion exchange membrane 34 even if the depressurizing speed in the depressurizing step is maintained at the predetermined speed, a voltage stopping step is performed. Alternatively, the voltage stopping step is performed after having performed the depressurizing step, while maintaining the application of voltage by the first power source device 16 in the manner described above. In the voltage stopping step, after the application of voltage to the water electrolysis stack 12 by the first power source device 16 is stopped, the application of voltage to the hydrogen pressure boosting stack 20 by the second power source device 90 is stopped.

According to the present embodiment, in the voltage stopping step, the application of voltage to the water electrolysis stack 12 is stopped prior to the application of voltage to the hydrogen pressure boosting stack 20 being stopped, and accordingly, the generation of hydrogen gas at the cathode 38 is stopped. Consequently, it is possible to suppress a rise in pressure of the hydrogen gas at the cathode 38, the cathode discharge flow path 68, and the first hydrogen gas flow path 78. Therefore, it is possible to effectively avoid a situation in which the hydrogen gas flows backward in the direction from the hydrogen pressure boosting stack 20 toward the water electrolysis stack 12. At this time, backward flow of the hydrogen gas in the direction from the hydrogen pressure boosting stack 20 toward the water electrolysis stack 12 may be suppressed by closing the first hydrogen ON/OFF valve 80.

Moreover, in the voltage stopping step, in the case that the backward flow of the hydrogen gas can be adequately suppressed, the application of voltage to the hydrogen pressure boosting stack 20 may be stopped, after the application of voltage to the water electrolysis stack 12 has been stopped.

After a state has been brought about by the voltage stopping step in which current does not flow between the anode 36 and the cathode 38 of the water electrolysis stack 12, a step of stopping the supply of water is performed. In the step of stopping the supply of water, the supply of water from the water tank 14 to the water electrolysis stack 12 is stopped. Thereafter, after having confirmed that a current is not flowing between the anode 86 and the cathode 88 of the hydrogen pressure boosting stack 20, the water electrolysis system 10 is placed in a stopped state.

In this manner, in the water electrolysis system 10 according to the present embodiment, by the oxygen gas discharge regulating unit 28, the pressure of the oxygen gas at the anode 36 becomes higher in pressure than the pressure of the hydrogen gas at the cathode 38. Consequently, permeation of the hydrogen gas through the ion exchange membrane 34 from the low pressure cathode 38 toward the high pressure anode 36 is suppressed.

A permeation amount (a crossover amount) of the hydrogen gas that permeates through the ion exchange membrane 34 varies depending on the pressure of the oxygen gas, the environmental temperature at the exterior of the water electrolysis stack 12, and the like. The amount of the hydrogen gas supplied from the water electrolysis stack 12 to the gas-liquid separator 18 fluctuates in accordance with such a variation. In this case, the amount of the hydrogen gas inside the gas-liquid separator 18 that is used by the hydrogen pressure boosting stack 20 in order to boost the pressure may become either excessive or insufficient. Stated otherwise, the amount of the hydrogen gas generated by the electrolysis of water by the water electrolysis stack 12, and the amount of the hydrogen gas that is used in the hydrogen pressure boosting stack 20 for boosting the pressure may become imbalanced depending on the environmental temperature and the like.

Figure 2:
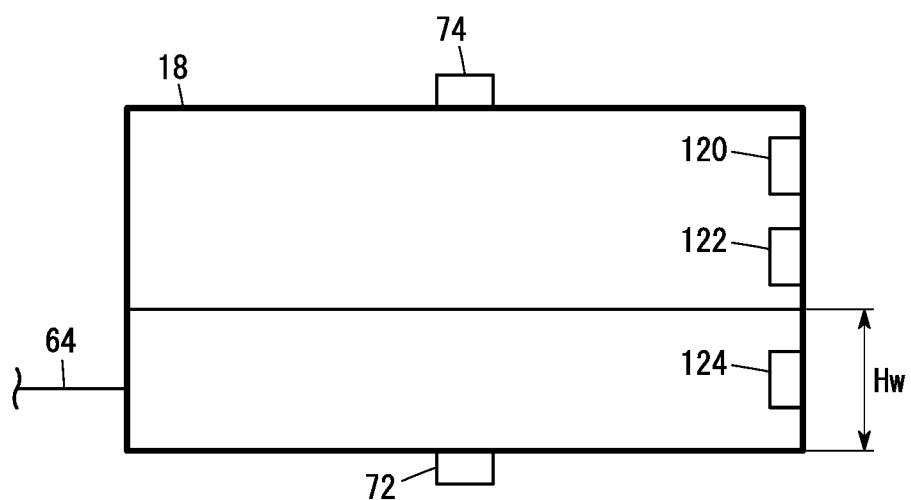
FIG. 2 is a schematic diagram of the interior of a gas-liquid separator.

Thus, according to the present embodiment, the first power source device 16 and the second power source device 90 are controlled based on the amount of the hydrogen gas inside the gas-liquid separator 18. FIG. 2 is a schematic diagram of the interior of the gas-liquid separator 18. A temperature sensor 120, a pressure sensor 122, and a water level sensor 124 are provided in the interior of the gas-liquid separator 18. The temperature sensor 120 is a measurement device that measures the temperature of a gas phase portion inside the gas-liquid separator 18. The pressure sensor 122 is a measurement device that measures the pressure of the gas phase portion inside the gas-liquid separator 18. The water level sensor 124 is a measurement device that measures a water level HW of a liquid phase portion inside the gas-liquid separator 18.

The amount of the hydrogen gas inside the gas-liquid separator 18 can be calculated using the relational expression "$HA=(Ph \times Vh)/(R \times Th)$". "HA" is the amount of the hydrogen gas inside the gas-liquid separator 18. "Th" is the temperature detected by the temperature sensor 120. "Ph" is the pressure detected by the pressure sensor 122. "Vh" is the volume of the gas phase portion inside the gas-liquid separator 18. This volume can be calculated based on the water level HW detected by the water level sensor 124. More specifically, the water level HW detected by the water level sensor 124 is multiplied by the area inside the gas-liquid separator 18 that is stored beforehand, and the value obtained by such multiplication is subtracted from the total volume inside the gas-liquid separator 18 that is stored beforehand. "R" is the gas constant.

Figure 3:
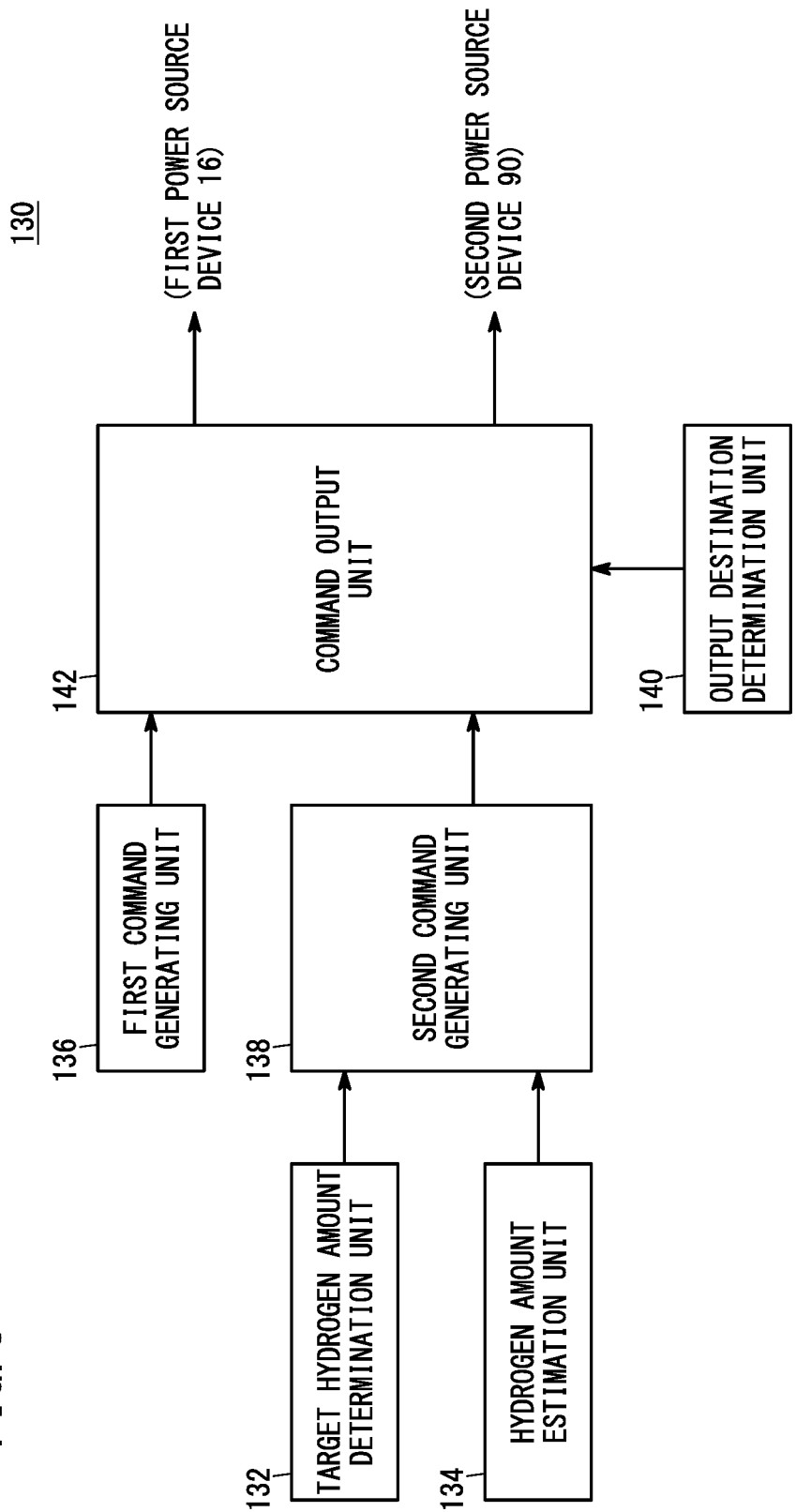
FIG. 3 is a block diagram showing the configuration of a control device.

FIG. 3 is a block diagram showing the configuration of a control device 130. The control device 130 controls the first power source device 16 and the second power source device 90. The control device 130 includes a target hydrogen amount determination unit 132, a hydrogen amount estimation unit 134, a first command generating unit 136, a second command generating unit 138, an output destination determination unit 140, and a command output unit 142.

The target hydrogen amount determination unit 132 determines a target amount of the hydrogen gas inside the gas-liquid separator 18, and outputs the target amount of the hydrogen gas to the second command generating unit 138. The target hydrogen amount determination unit 132 may set the target amount of the hydrogen gas based on at least one from among the temperature detected by the temperature sensor 120, the pressure detected by the pressure sensor 122, and the amount of the hydrogen gas estimated by the hydrogen amount estimation unit 134. The target hydrogen amount determination unit 132 may determine, as the target amount of the hydrogen gas, an amount of the hydrogen gas that is stored in a storage unit such as a memory or the like. The amount of the hydrogen gas stored in the storage unit can be changed in accordance with an operation of the input device made by the user.

The hydrogen amount estimation unit 134 estimates the amount of the hydrogen gas inside the gas-liquid separator 18, and outputs the amount of the hydrogen gas to the second command generating unit 138. The hydrogen amount estimation unit 134 can estimate the amount of the hydrogen gas using the aforementioned relational expression.

The first command generating unit 136 generates a first current command value, which is a constant current command value, and outputs the first current command value to the command output unit 142. The first command generating unit 136 can generate a base current value, which is stored in advance in a storage unit such as a memory or the like, as the first current command value.

The second command generating unit 138 generates a second current command value, which is an indefinite current command value, and outputs the second current command value to the command output unit 142. The second command generating unit 138 is capable of generating the second current command value, in a manner so as to approach the target amount of the hydrogen gas determined by the target hydrogen amount determination unit 132. In this case, the second command generating unit 138 calculates a deviation between the target amount of the hydrogen gas determined by the target hydrogen amount determination unit 132 and the amount of the hydrogen gas estimated by the hydrogen amount estimating unit 134, and generates the second current command value on the basis of such a deviation.

The output destination determination unit 140 determines one from among the water electrolysis stack 12 and the hydrogen pressure boosting stack 20 as being the first output device that outputs the first current command value. Further, the output destination determination unit 140 determines the other one from among the water electrolysis stack 12 and the hydrogen pressure boosting stack 20 as being the second output device that outputs the second current command value. In this case, the output destination determination unit 140 determines the first output device and the second output device, on the basis of the load of the membrane electrode assembly 50 of the water electrolysis stack 12, and the load of the membrane electrode assembly 83 of the hydrogen pressure boosting stack 20.

According to the present embodiment, on the basis of a water electrolysis current sensor 144 and a water electrolysis voltage sensor 146, the output destination determination unit 140 determines whether or not the load on the membrane electrode assembly 50 is large. In the case that a value obtained by subtracting the predetermined first set voltage from the voltage value acquired at a time when the predetermined first current flows between the anode 36 and the cathode 38 has exceeded a predetermined first determination threshold value, the output destination determination unit 140 determines that the load on the membrane electrode assembly 50 is large. Conversely, in the case that the value obtained by subtracting the predetermined first set voltage from the voltage value at the time when the predetermined first current flows between the anode 36 and the cathode 38 is less than or equal to the predetermined first determination threshold value, the output destination determination unit 140 determines that the load on the membrane electrode assembly 50 is not large. Moreover, it should be noted that the first current, the first set voltage, and the first threshold value are stored in advance in the memory of the control device 130.

On the other hand, according to the present embodiment, on the basis of a hydrogen pressure boosting current sensor 148 and a hydrogen pressure boosting voltage sensor 150, the output destination determination unit 140 determines whether or not the load on the membrane electrode assembly 83 is large. In the case that a value obtained by subtracting the predetermined second set voltage from the voltage value at a time when the predetermined second current flows between the anode 86 and the cathode 88 has exceeded a predetermined second determination threshold value, the output destination determination unit 140 determines that the load on the membrane electrode assembly 83 is large. Conversely, in the case that the value obtained by subtracting the predetermined second set voltage from the voltage value at the time when the predetermined second current flows between the anode 86 and the cathode 88 is less than or equal to the predetermined second determination threshold value, the output destination determination unit 140 determines that the load on the membrane electrode assembly 83 is not large. Moreover, it should be noted that the second current, the second set voltage, and the second threshold value are stored in advance in the memory of the control device 130.

In the following case, the output destination determination unit 140 determines the water electrolysis stack 12 as being the first output device, and determines the hydrogen pressure boosting stack 20 as being the second output device. More specifically, this is a case in which it is determined that the load on the membrane electrode assembly 50 is large, and it is determined that the load on the membrane electrode assembly 83 is not large.

In the following case, the output destination determination unit 140 determines the water electrolysis stack 12 as being the second output device, and determines the hydrogen pressure boosting stack 20 as being the first output device. More specifically, this is a case in which it is determined that the load on the membrane electrode assembly 50 is not large, and it is determined that the load on the membrane electrode assembly 83 is large. Alternatively, this is a case in which it is determined that the loads on both of the membrane electrode assembly 50 and the membrane electrode assembly 83 are large. Alternatively, this is a case in which it is determined that the loads on both of the membrane electrode assembly 50 and the membrane electrode assembly 83 are not large.

The command output unit 142 outputs the first current command value generated by the first command generating unit 136 to one from among the first power source device 16 and the second power source device 90. Further, the command output unit 142 outputs the second current command value generated by the second command generating unit 138 to the other one from among the first power source device 16 and the second power source device 90.

In the case that the first output device determined by the output destination determination unit 140 is the water electrolysis stack 12, the command output unit 142 outputs the first current command value to the first power source device 16. In the case that the first output device determined by the output destination determination unit 140 is the hydrogen pressure boosting stack 20, the command output unit 142 outputs the first current command value to the second power source device 90.

On the other hand, in the case that the second output device determined by the output destination determination unit 140 is the water electrolysis stack 12, the command output unit 142 outputs the second current command value to the first power source device 16. In the case that the second output device determined by the output destination determination unit 140 is the hydrogen pressure boosting stack 20, the command output unit 142 outputs the second current command value to the second power source device 90.

The first power source device 16 adjusts the voltage applied to the anode 36 and the cathode 38, in a manner so that the current of the first current command value or the second current command value is made to flow. As a result thereof, in the water electrolysis stack 12, the hydrogen gas is generated in an amount corresponding to the first current command value or the second current command value.

On the other hand, the second power source device 90 adjusts the voltage applied to the anode 86 and the cathode 88, in a manner so that the current of the first current command value or the second current command value is made to flow. As a result thereof, in the hydrogen pressure boosting stack 20, the hydrogen gas is boosted in pressure to an amount corresponding to the first current command value or the second current command value, and thereby, the high pressure hydrogen gas is generated.

Figure 4:
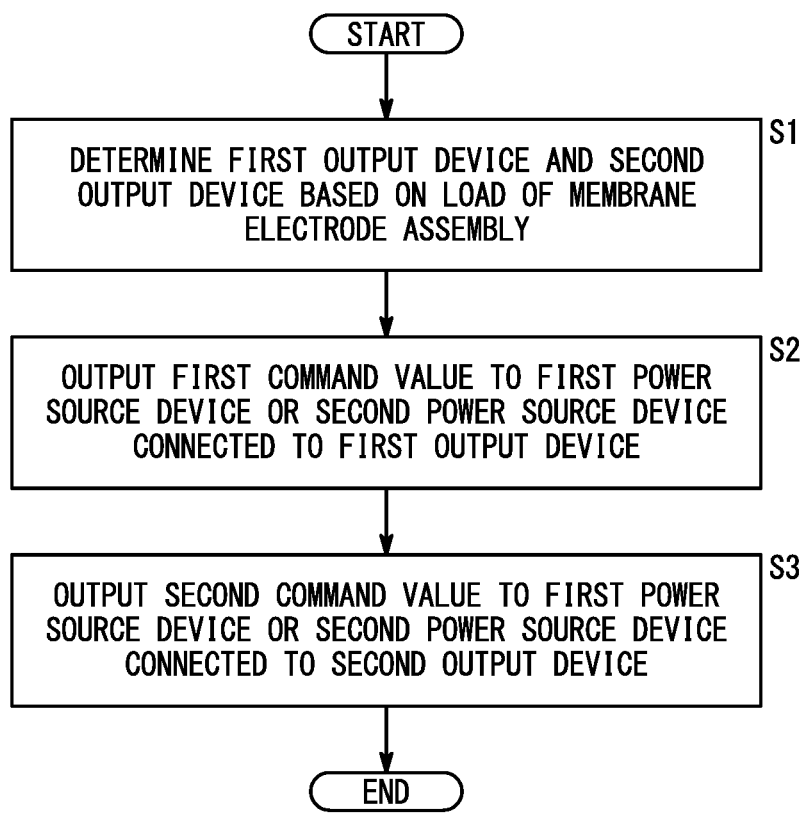
FIG. 4 is a flowchart showing the procedure of a control process carried out by the control device.

Next, a description will be given concerning a method of operating the water electrolysis system 10. FIG. 4 is a flowchart showing a procedure of the control process carried out by the control device 130. The control process is initiated, for example, at a time when the control device 130 has received a command to operate the water electrolysis system 10.

In step S1, the output destination determination unit 140 determines the first output device and the second output device, on the basis of the load of the membrane electrode assembly 50 of the water electrolysis stack 12, and the load of the membrane electrode assembly 83 of the hydrogen pressure boosting stack 20. When the first output device and the second output device are determined, the control process proceeds to step S2.

In step S2, the first command generating unit 136 generates a predetermined first current command value. The command output unit 142 outputs the first current command value generated by the first command generating unit 136 to the first power source device 16 or the second power source device 90 that is connected to the first output device that was determined in step S1. When the first current command value is output to the first power source device 16 or the second power source device 90, the control process proceeds to step S3.

In step S3, the second command generating unit 138 generates a predetermined second current command value. More specifically, the target hydrogen amount determination unit 132 determines the target amount of the hydrogen gas (the target amount of the hydrogen) inside the gas-liquid separator 18. On the other hand, the hydrogen amount estimation unit 134 starts to estimate the amount of the hydrogen gas (an estimated amount of the hydrogen) inside the gas-liquid separator 18. The second command generating unit 138 periodically compares the estimated amount of the hydrogen with the target amount of the hydrogen, and generates a second current command value based on the deviation from the target amount of the hydrogen.

Each time that the second current command value is generated by the second command generating unit 138, the command output unit 142 outputs the second current command value to the first power source device 16 or the second power source device 90 that is connected to the second output device that was determined in step S1. The command output unit 142 continues to output the second current command value until the control device 130 receives an operation stop command to stop operation of the water electrolysis system 10. When the control device 130 receives the operation stop command, the control process comes to an end.

The above-described embodiment may be modified in the following manner.

(Exemplary Modification 1)

Figure 5:
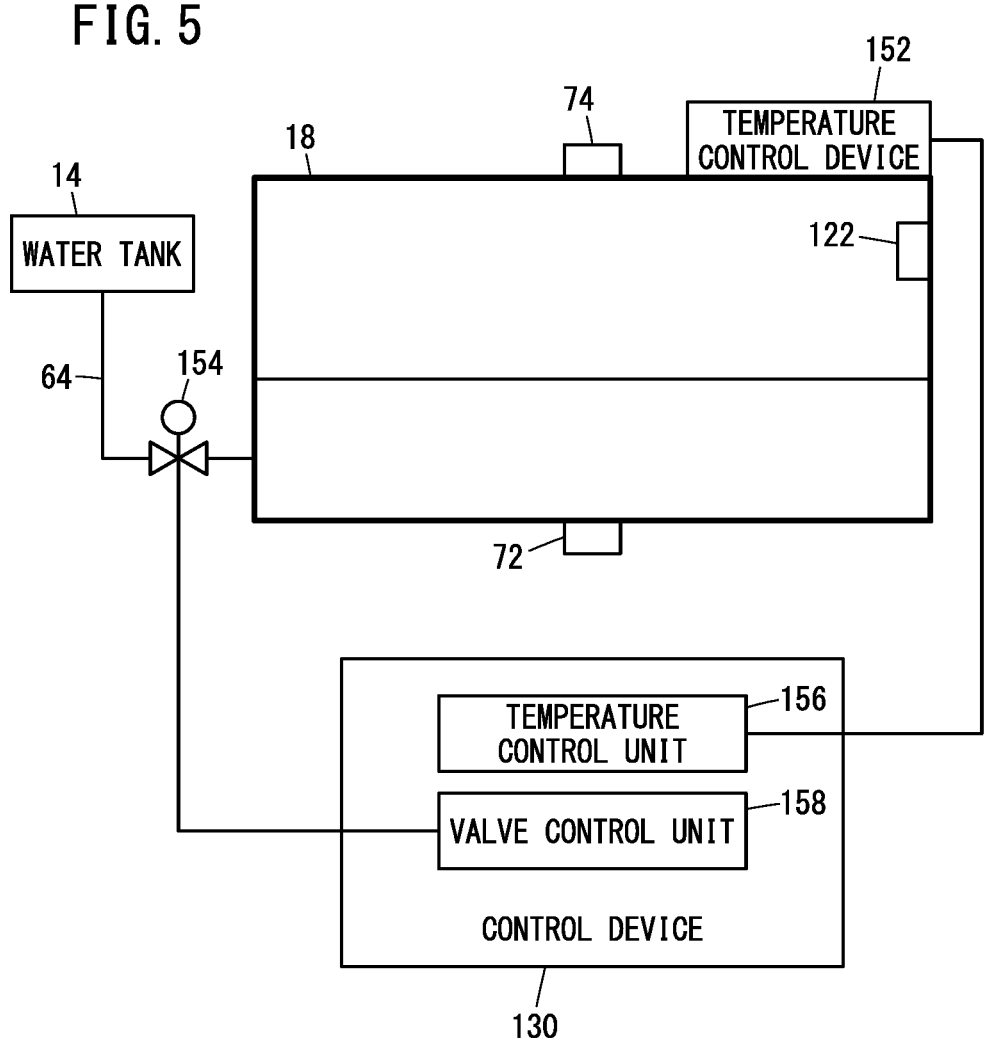
FIG. 5 is a diagram showing a partial configuration of a water electrolysis system according to an Exemplary Modification 1.

FIG. 5 is a diagram showing a partial configuration of the water electrolysis system 10 according to an Exemplary Modification 1. In the present exemplary modification, a temperature control device 152 is provided in the gas-liquid separator 18. The temperature control device 152 is configured to be capable of adjusting the temperature inside the gas-liquid separator 18. Further, in the present exemplary modification, a flow rate adjustment valve 154 is provided in the water supply flow path 64. The flow rate adjustment valve 154 is configured to be capable of adjusting the flow rate of the water that flows through the water supply flow path 64.

According to the present exemplary modification, the control device 130 further includes a temperature control unit 156 and a valve control unit 158. The temperature control unit 156 controls the temperature control device 152, and thereby maintains the temperature inside the gas-liquid separator 18 constant. Further, the valve control unit 158 controls the flow rate adjustment valve 154, and thereby adjusts the amount of water supplied to the gas-liquid separator 18, and thus maintains the water level HW in the gas-liquid separator 18 constant.

Since the temperature and water level HW inside the gas-liquid separator 18 are kept constant, the amount of the hydrogen gas inside the gas-liquid separator 18 is roughly proportional to the pressure detected by the pressure sensor 122. Accordingly, based only on the pressure detected by the pressure sensor 122, the hydrogen amount estimation unit 134 (see FIG. 3) is capable of estimating the amount of the hydrogen gas inside the gas-liquid separator 18.

(Exemplary Modification 2)

Instead of the temperature sensor 120, the pressure sensor 122, and the water level sensor 124, a hydrogen gas sensor may be provided inside the gas-liquid separator 18. In this case, based on the concentration of the hydrogen gas detected by the hydrogen gas sensor, the hydrogen amount estimation unit 134 is capable of estimating the amount of the hydrogen gas inside the gas-liquid separator 18.

(Exemplary Modification 3)

The output destination determination unit 140 may determine the first output device and the second output device, on the basis of the period during which the membrane electrode assembly 50 of the water electrolysis stack 12 and the membrane electrode assembly 83 of the hydrogen pressure boosting stack 20 are used.

In this case, for example, the output destination determination unit 140 is capable of determining whether or not the load of the membrane electrode assembly 50 is large, based on the manufacturing date of the membrane electrode assembly 50, which is stored in a storage unit such as a memory or the like, and the current date. Similarly, the output destination determination unit 140 is capable of determining whether or not the load of the membrane electrode assembly 83 is large, based on the manufacturing date of the membrane electrode assembly 83, which is stored in the storage unit such as a memory or the like, and the current date.

A description will be given below concerning the invention and the advantageous effects thereof that are capable of being grasped from the above disclosure.

(1) The present invention is characterized by the water electrolysis system (10), comprising the water electrolysis stack (12) including the membrane electrode assembly (50) in which the ion exchange membrane (34) is sandwiched between the anode (36) and the cathode (38), and which carries out electrolysis of water, the gas-liquid separator (18) that separates the hydrogen gas generated by electrolysis of the water by the water electrolysis stack, and the water, and the hydrogen pressure boosting stack (20) including the membrane electrode assembly (83) in which the proton exchange membrane (84) is sandwiched between the anode (86) and the cathode (88), and which boosts the pressure of the hydrogen gas that is separated by the gas-liquid separator. The water electrolysis system further includes the first power source device (16) that adjusts the voltage applied to the anode and the cathode of the water electrolysis stack, and supplies the current of the current command value between the anode and the cathode, the second power source device (90) that adjusts the voltage applied to the anode and the cathode of the hydrogen pressure boosting stack, and supplies the current of the current command value between the anode and the cathode, and the control device (130) that controls the first power source device and the second power source device. The control device includes the first command generating unit (136) that generates the first current command value, which is a constant current command value, the second command generating unit (138) that generates the second current command value, which is an undefined current command value, based on the amount of the hydrogen gas inside the gas-liquid separator; and the command output unit (142) which outputs the first current command value to one from among the first power source device and the second power source device, and outputs the second current command value to another one from among the first power source device and the second power source device.

In accordance therewith, one from among the amount of the hydrogen gas that is generated and the amount of the hydrogen gas that is used is constant, and the other one from among the amount of the hydrogen gas that is generated and the amount of the hydrogen gas that is used can be adjusted based on the amount of the hydrogen gas inside the gas-liquid separator. As a result, even if the crossover amount of the water electrolysis stack changes in accordance with the environmental temperature or the like, any imbalance between the amount of the hydrogen gas that is generated and the amount of the hydrogen gas that is used can be suppressed.

(2) The present invention is characterized by the water electrolysis system, in which the control unit includes the output destination determination unit (140) that determines one from among the water electrolysis stack and the hydrogen pressure boosting stack as being the first output device that outputs the first current command value, and determines another one from among the water electrolysis stack and the hydrogen pressure boosting stack as being the second output device that outputs the second current command value, and the command output unit outputs the first current command value to the first power source device or the second power source device connected to the first output device, and outputs the second current command value to the first power source device or the second power source device connected to the second output device. In accordance with such features, it becomes possible to switch the output destinations of the first current command value and the second current command value.

(3) The present invention is characterized by the water electrolysis system, in which the output destination determination unit determines the first output device and the second output device based on the load of the membrane electrode assembly of the water electrolysis stack, and the load of the membrane electrode assembly of the hydrogen pressure boosting stack. In accordance with such features, a constant current can be made to flow between the anode and the cathode of the membrane electrode assembly with a large load. As a result, in the water electrolysis stack and the hydrogen pressure boosting stack, it is possible to reduce the deterioration of the membrane electrode assembly which has a relatively large load.

(4) The present invention is characterized by the water electrolysis system, in which the output destination determination unit determines the loads of the membrane electrode assemblies, based on a voltage value at a time when the first current is supplied between the anode and the cathode of the water electrolysis stack, and the first deviation which is a deviation from the first set voltage value, and a voltage value at a time when the second current is supplied between the anode and the cathode of the hydrogen pressure boosting stack, and the second deviation which is a deviation from a second set voltage value. In accordance with such features, the loads of the membrane electrode assemblies can be determined more accurately as compared with a case in which the loads are determined based on the years of use of the membrane electrode assemblies.

(5) The present invention is characterized by the water electrolysis system, in which the measurement device (120, 122) is included that measures at least one of the temperature and the pressure in the gas-liquid separator, wherein the second command generating unit estimates the amount of the hydrogen gas in the gas-liquid separator from at least one of the temperature and the pressure measured by the measurement device. In accordance with such features, an increase in an error from the actual amount of the hydrogen gas inside the gas-liquid separator can be suppressed.

(6) The present invention is characterized by the water electrolysis system, in which the second command generating unit generates the second current command value, in a manner so that the amount of the hydrogen gas inside the gas-liquid separator approaches the target amount of the hydrogen gas. In accordance with this feature, even if the environmental temperature or the like changes, the amount of the hydrogen gas inside the gas-liquid separator can be appropriately adjusted.

(7) The present invention is characterized by the method of operating the water electrolysis system, wherein the water electrolysis system comprises the water electrolysis stack including the membrane electrode assembly in which the ion exchange membrane is sandwiched between the anode and the cathode, and which carries out electrolysis of water, the gas-liquid separator that separates the hydrogen gas generated by electrolysis of the water by the water electrolysis stack, and the water, and the hydrogen pressure boosting stack including the membrane electrode assembly in which the proton exchange membrane is sandwiched between the anode and the cathode, and which boosts the pressure of the hydrogen gas that is separated by the gas-liquid separator. The method of operating the water electrolysis system comprises the first output step (step S2) of generating the first current command value, which is a constant current command value, and outputting the first current command value to one from among the first power source device connected to the water electrolysis stack and the second power source device connected to the hydrogen pressure boosting stack, and the second output step (step S3) of generating the second current command value, which is an indefinite current command value, based on the amount of the hydrogen gas inside the gas-liquid separator, and outputting the second current command value to another one from among the first power source device and the second power source device.

In accordance therewith, one from among the amount of the hydrogen gas that is generated and the amount of the hydrogen gas that is used is constant, and the other one from among the amount of the hydrogen gas that is generated and the amount of the hydrogen gas that is used can be adjusted based on the amount of the hydrogen gas inside the gas-liquid separator. As a result, even if the crossover amount of at least one of the water electrolysis stack and the hydrogen pressure boosting stack changes in accordance with the environmental temperature or the like, any imbalance between the amount of the hydrogen gas that is generated and the amount of the hydrogen gas that is used can be suppressed.

The present invention is not limited to the aforementioned disclosure, and various modifications are capable of being adopted therein without departing from the essence and gist of the present invention.

The invention claimed is:

1. A water electrolysis system, comprising:
   a water electrolysis stack including a membrane electrode assembly in which an ion exchange membrane is sandwiched between an anode and a cathode, and configured to carry out electrolysis of water;
   a gas-liquid separator configured to separate hydrogen gas generated by electrolysis of the water by the water electrolysis stack, and the water; and
   a hydrogen pressure boosting stack including a membrane electrode assembly in which a proton exchange membrane is sandwiched between an anode and a cathode, and configured to boost the pressure of the hydrogen gas that is separated by the gas-liquid separator;
   the water electrolysis system further comprising:
   a first power source device configured to adjust a voltage applied to the anode and the cathode of the water electrolysis stack, and to supply a current of a current command value between the anode and the cathode;
   a second power source device configured to adjust a voltage applied to the anode and the cathode of the hydrogen pressure boosting stack, and to supply a current of the current command value between the anode and the cathode; and
   a control device configured to control the first power source device and the second power source device;
   wherein the control device comprises:
   a first command generating unit configured to generate a first current command value, which is a constant current command value;
   a second command generating unit configured to generate a second current command value, which is an undefined current command value, based on an amount of the hydrogen gas inside the gas-liquid separator; and
   a command output unit configured to output the first current command value to one from among the first power source device and the second power source device, and to output the second current command value to another one from among the first power source device and the second power source device.

2. The water electrolysis system according to claim 1, wherein:
   the control unit includes an output destination determination unit configured to determine one from among the water electrolysis stack and the hydrogen pressure boosting stack as being a first output device configured to output the first current command value, and to determine another one from among the water electrolysis stack and the hydrogen pressure boosting stack as being a second output device configured to output the second current command value; and
   the command output unit outputs the first current command value to the first power source device or the second power source device connected to the first output device, and outputs the second current command value to the first power source device or the second power source device connected to the second output device.

3. The water electrolysis system according to claim 2, wherein the output destination determination unit determines the first output device and the second output device, based on a load of the membrane electrode assembly of the water electrolysis stack, and a load of the membrane electrode assembly of the hydrogen pressure boosting stack.

4. The water electrolysis system according to claim 3, wherein the output destination determination unit determines the loads of the membrane electrode assemblies, based on a voltage value at a time when a first current is supplied between the anode and the cathode of the water electrolysis stack, and a first deviation which is a deviation from a first set voltage value, and a voltage value at a time when a second current is supplied between the anode and the cathode of the hydrogen pressure boosting stack, and a second deviation which is a deviation from a second set voltage value.

5. The water electrolysis system according to claim 1, further comprising:
   a measurement device configured to measure at least one of a temperature and a pressure in the gas-liquid separator;
   wherein the second command generating unit estimates the amount of the hydrogen gas in the gas-liquid separator from at least one of the temperature and the pressure measured by the measurement device.

6. The water electrolysis system according to claim 5, wherein the second command generating unit generates the second current command value, in a manner so that the amount of the hydrogen gas inside the gas-liquid separator approaches a target amount of the hydrogen gas.

7. A method of operating a water electrolysis system, wherein the water electrolysis system comprises:

a water electrolysis stack including a membrane electrode assembly in which an ion exchange membrane is sandwiched between an anode and a cathode, and configured to carry out electrolysis of water;

a gas-liquid separator configured to separate hydrogen gas generated by electrolysis of the water by the water electrolysis stack, and the water; and a hydrogen pressure boosting stack including a membrane electrode assembly in which a proton exchange membrane is sandwiched between an anode and a cathode, and configured to boost the pressure of the hydrogen gas that is separated by the gas-liquid separator;

the method of operating the water electrolysis system comprising:

a first output step of generating a first current command value, which is a constant current command value, and outputting the first current command value to one from among the first power source device connected to the water electrolysis stack and the second power source device connected to the hydrogen pressure boosting stack; and a second output step of generating a second current command value, which is an indefinite current command value, based on an amount of the hydrogen gas inside the gas-liquid separator, and outputting the second current command value to another one from among the first power source device and the second power source device.

* * * * *